(12) United States Patent
Pekkucuksen et al.

(10) Patent No.: US 10,805,649 B2
(45) Date of Patent: Oct. 13, 2020

(54) SYSTEM AND METHOD FOR BLENDING MULTIPLE FRAMES INTO A SINGLE FRAME

(71) Applicant: Samsung Electronics Co., Ltd., Suwon-si (KR)

(72) Inventors: Ibrahim E. Pekkucuksen, Plano, TX (US); John Glotzbach, Allen, TX (US); Hamid R. Sheikh, Allen, TX (US); Rahul Rithe, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 94 days.

(21) Appl. No.: 15/862,465

(22) Filed: Jan. 4, 2018

(65) Prior Publication Data
US 2018/0192098 A1 Jul. 5, 2018

Related U.S. Application Data

(60) Provisional application No. 62/442,149, filed on Jan. 4, 2017.

(51) Int. Cl.
*H04N 21/2343* (2011.01)
*G06K 9/00* (2006.01)
(Continued)

(52) U.S. Cl.
CPC . *H04N 21/234345* (2013.01); *G06K 9/00234* (2013.01); *G06K 9/4652* (2013.01); *G06K 9/6211* (2013.01); *G06K 9/6289* (2013.01); *G06T 5/002* (2013.01); *G06T 5/003* (2013.01); *G06T 5/50* (2013.01); *H04N 5/2329* (2013.01);
(Continued)

(58) Field of Classification Search
CPC ....... H04N 21/234345; H04N 5/23267; H04N 5/23254; H04N 5/2329; H04N 7/0117; H04N 19/543; G06T 5/002; G06T 5/50; G06T 5/003; G06T 2207/30236; G06T 2207/30196; G06T 2207/20221; G06T 2207/20012; G06T 2207/10024; G06T 2207/10016; G06T 2207/20028; G06K 9/6211; G06K 9/4652; G06K 9/00234; G06K 9/6289
See application file for complete search history.

(56) References Cited

U.S. PATENT DOCUMENTS 8,577,137 B2 11/2013 Aisaka et al.
8,599,922 B2 12/2013 Cho et al.
(Continued)

FOREIGN PATENT DOCUMENTS

JP 2015204599 A 11/2015

*Primary Examiner* — Richard A Hansell, Jr.

(57) ABSTRACT

A method and device for blending multiple related frames into a single frame to reduce noise is disclosed. A method includes comparing an input frame to a corresponding reference frame in order to determine if at least one object that is in both frames moves in the input frame, and also to determine edge strengths of the at least one object. The method further includes, based on the comparison, determining which regions of the input frame to blend with corresponding regions of the reference frame, which regions of the input frame not to blend with corresponding regions of the reference frame, and which regions of the input frame to partially blend with corresponding regions of the reference frame.

20 Claims, 11 Drawing Sheets

(51) Int. Cl.
*G06K 9/62* (2006.01)
*G06T 5/00* (2006.01)
*H04N 19/543* (2014.01)
*G06K 9/46* (2006.01)
*H04N 5/232* (2006.01)
*H04N 7/01* (2006.01)
*G06T 5/50* (2006.01)

(52) U.S. Cl.
CPC ..... *H04N 5/23254* (2013.01); *H04N 5/23267* (2013.01); *H04N 7/0117* (2013.01); *H04N 19/543* (2014.11); *G06T 2207/10016* (2013.01); *G06T 2207/10024* (2013.01); *G06T 2207/20012* (2013.01); *G06T 2207/20028* (2013.01); *G06T 2207/20221* (2013.01); *G06T 2207/30196* (2013.01); *G06T 2207/30236* (2013.01)

(56) References Cited

U.S. PATENT DOCUMENTS

| | | | |
|---|---|---|---|
| 9,036,939 B2* | 5/2015 | Ouzilevski | G06T 5/20 382/274 |
| 9,280,805 B2 | 3/2016 | Esaki | |
| 9,374,506 B2* | 6/2016 | Biswas | G06T 5/002 |
| 2006/0241371 A1* | 10/2006 | Rafii | G01S 7/497 600/407 |
| 2007/0263905 A1* | 11/2007 | Chang | H04N 5/144 382/107 |
| 2008/0240617 A1* | 10/2008 | Douniwa | H04N 5/145 382/300 |
| 2016/0224864 A1* | 8/2016 | Chang | G06K 9/4604 |
| 2016/0360230 A1 | 12/2016 | Song et al. | |

* cited by examiner

SYSTEM AND METHOD FOR BLENDING MULTIPLE FRAMES INTO A SINGLE FRAME

CROSS-REFERENCE TO RELATED APPLICATION(S) AND CLAIM OF PRIORITY

This application claims priority under 35 U.S.C. § 119(e) to U.S. Provisional Patent Application No. 62/442,149 filed on Jan. 4, 2017. The above-identified provisional patent application is hereby incorporated by reference in its entirety.

TECHNICAL FIELD

This disclosure relates generally to image processing. More specifically, this disclosure relates to systems and methods for blending multiple related frames into a single frame to reduce noise while avoiding artifacts from objects in motion between the frames.

BACKGROUND

With the popularity of mobile devices that include digital cameras, almost everyone can take a picture at any time. As the quality of the camera hardware in mobile devices has improved, users have begun to expect high quality photos from their devices. However, the camera hardware in mobile devices still has significant limitations, such as low or no optical zoom, poor low light performance, or the like. There are a number of ways that noise can be introduced to a digital photograph, including use of digital zoom and use of high ISO in low light settings. However, it is possible to use image processing to account for and remove artifacts caused by noise.

SUMMARY

Embodiments of the present disclosure provide systems and methods for blending multiple related frames into a single frame to reduce noise while avoiding artifacts from objects in motion between the frames.

In one embodiment, a method of a camera device is disclosed. The method includes comparing an input frame to a corresponding reference frame in order to determine if at least one object that is in both frames moves in the input frame, and also to determine edge strengths of the at least one object. The method further includes, based on the comparison, determining which regions of the input frame to blend with corresponding regions of the reference frame, which regions of the input frame not to blend with corresponding regions of the reference frame, and which regions of the input frame to partially blend with corresponding regions of the reference frame.

In another embodiment, a camera device is disclosed. The device includes a camera configured to capture at least a reference frame and a corresponding input frame of a scene. The device further includes a processor coupled to the camera. The processor is configured to compare the input frame to the reference frame in order to determine if at least one object that is in both frames moves in the input frame, and also to determine edge strengths of the at least one object and, based on the comparison, determine which regions of the input frame to blend with corresponding regions of the reference frame, which regions of the input frame not to blend with corresponding regions of the reference frame, and which regions of the input frame to partially blend with corresponding regions of the reference frame.

In another embodiment, a non-transitory computer readable medium embodying a computer program is disclosed. The computer program comprises computer readable program code that when executed causes at least one processing device to cause a device to compare an input frame to a corresponding reference frame in order to determine if at least one object that is in both frames moves in the input frame, and also to determine edge strengths of the at least one object, and, based on the comparison, determine which regions of the input frame to blend with corresponding regions of the reference frame, which regions of the input frame not to blend with corresponding regions of the reference frame, and which regions of the input frame to partially blend with corresponding regions of the reference frame.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
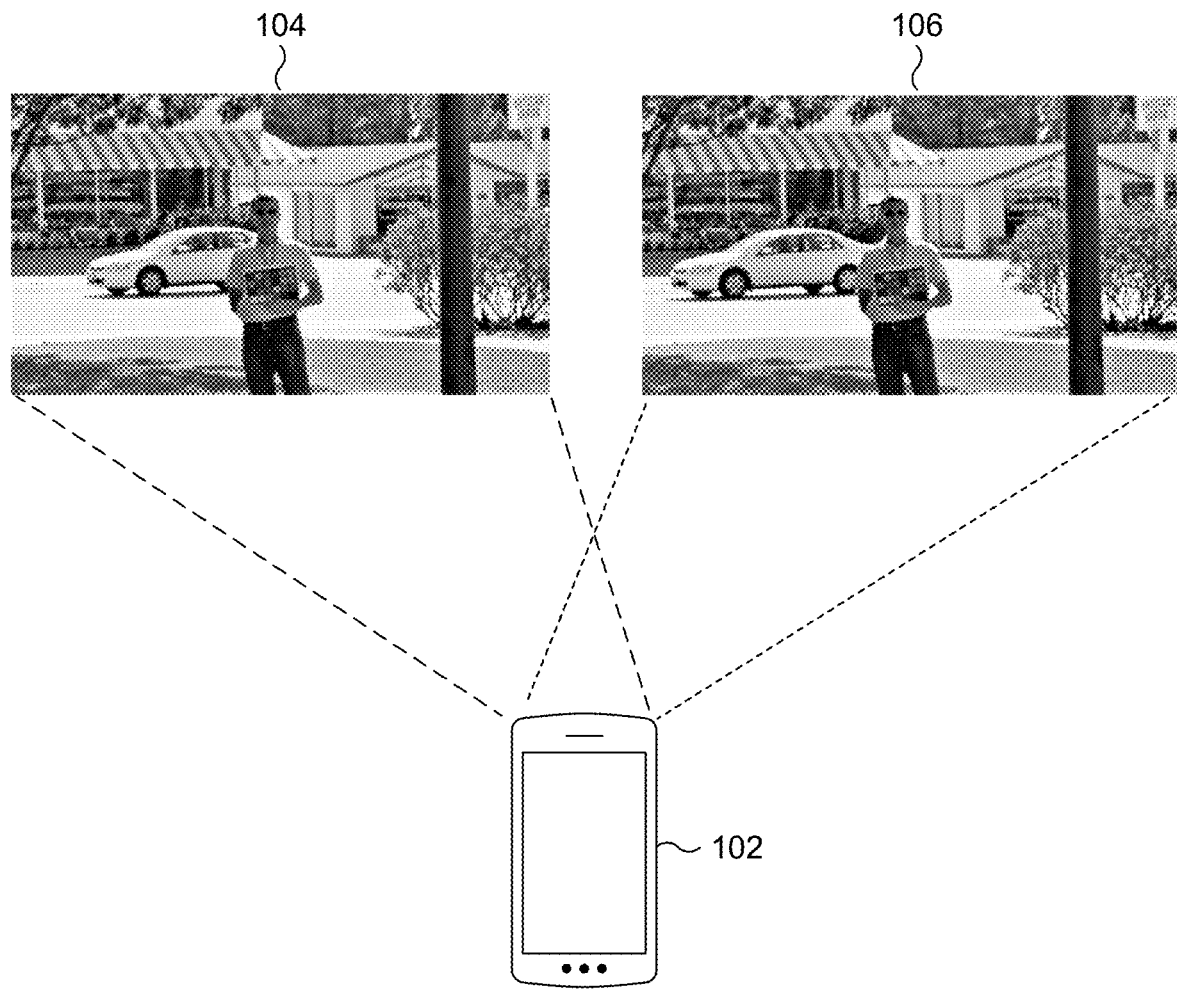
FIG. 1 illustrates an example digital camera system that uses frame blending according to various embodiments of this disclosure.

FIG. 1 illustrates an example digital camera system that uses frame blending according to various embodiments of this disclosure. The embodiment of the camera system shown in FIG. 1 is for illustration only. Other embodiments of the camera system could be used without departing from the scope of this disclosure.

As shown in FIG. 1, the system includes a camera device 102, which includes hardware for capturing digital photographs. In some embodiments, the camera device 102 may be a mobile device such as a mobile phone, tablet computer, personal digital assistant (PDA), or the like. In other embodiments, the camera device 102 may be a digital camera.

When the camera device 102 captures a photograph, for example after a user actuates a capture button on the camera device 102 or within a user interface of the camera device 102, it captures two or more input frames of the same scene in a burst such that the input frames are close together in time. In the example of FIG. 1, frame 104 is captured first, and frame 106 is captured soon afterward, and both frames 104 and 106 are of roughly the same subject. The camera device 102 then selectively blends the two or more input frames into a single output image that has less noise and more image detail than any individual input frame.

Since the input frames are captured at slightly different times, their content is different due to moving objects in the scene, such as the car in frames 104 and 106, slight changes in pose and position of the camera device 102 (for example, due to shaky hands of a user holding the camera device 102), and inherent random noise. A frame alignment algorithm can mostly take care of frame differences due to camera motion, and a pre-blending noise filter can reduce the noise. However, depending on several factors such as the amount and nature of camera motion, rolling shutter effect, scene illumination changes, etc., the input frames will still contain some misalignment and noise.

To correct for this, the system selects a reference frame and compares each non-reference frame to the selected reference frame. The system then decides which regions of the frames to blend together, which regions of the frames to reject from blending (instead using that region from the reference frame), and which regions of the frames to partially blend. In this context, blending refers to performing a pixel-by-pixel weighted average of the pixel values of the portions of the reference and non-reference frames to be blended. For fully blended portions, the pixel values of the portions of the two frames to blended are simply averaged (i.e., they both have the same weight). For partially blended portions, the weight of the non-reference frame is decreased, and less weight is given to the non-reference frame in the weighted average. In rejected portions, no weight is given to the non-reference frame's pixels. The objective is to blend the frames as much as possible (which reduces the noise), while avoiding blending regions with object motion (which would introduce ghosting artifacts).

Figure 2:
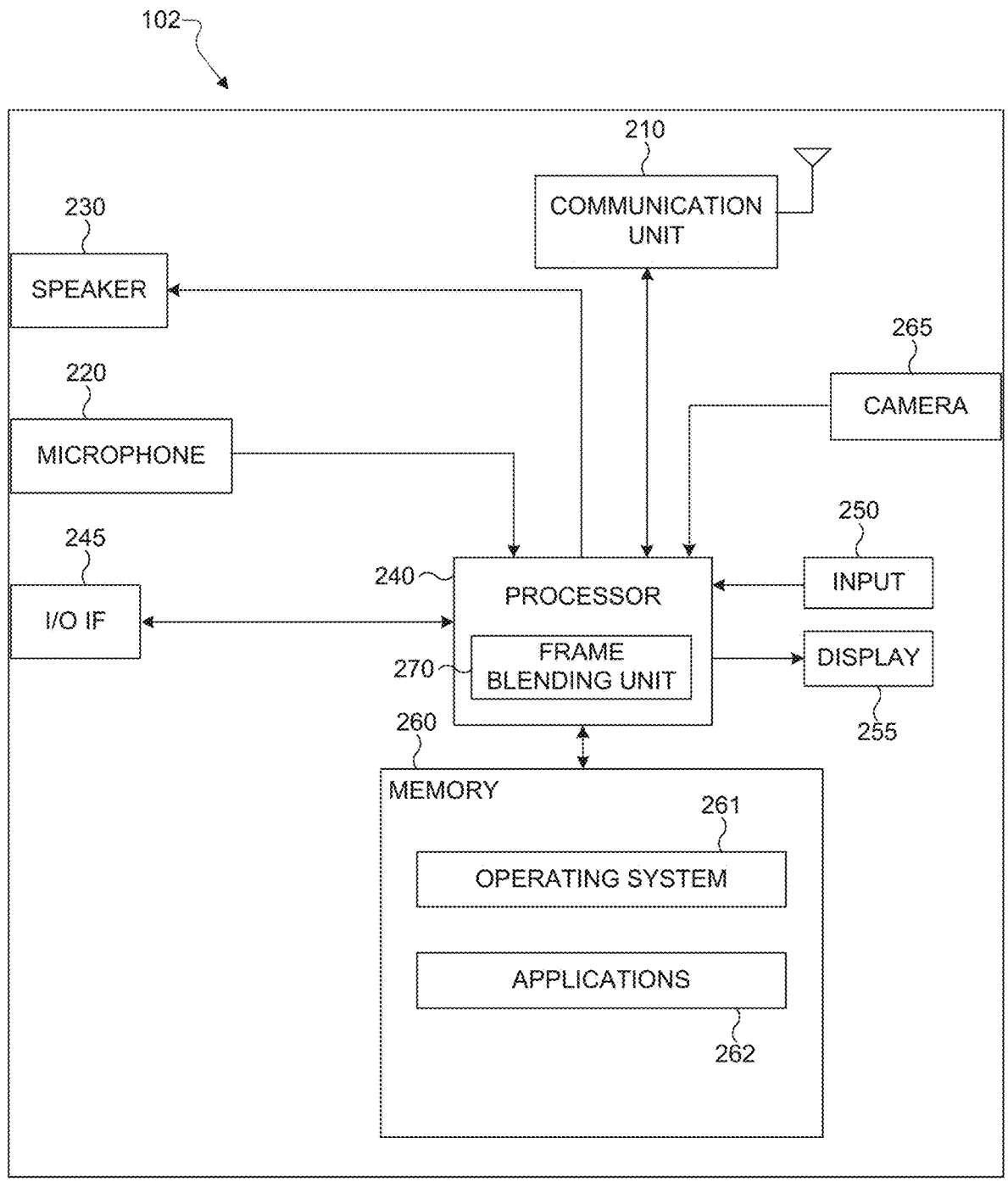
FIG. 2 illustrates an example camera device according to illustrative embodiments of the present disclosure.

FIG. 2 illustrates an example camera device 102 according to illustrative embodiments of this disclosure. In some embodiments, the camera device 102 could comprise a mobile phone. As shown in FIG. 2, the camera device 102 includes a communication unit 210 that may include, for example, a radio frequency (RF) transceiver, a Bluetooth® transceiver, or a Wi-Fi® transceiver. The camera device 102 also includes a speaker 230, a processor 240, an input/output (I/O) interface (IF) 245, an input interface 250, a display 255, a memory 260, and a camera 265. The processor 240 includes a frame blending unit 270. The memory 260 includes an operating system (OS) program 261 and one or more applications 262. In some embodiments, the camera device 102 also functions as a mobile phone.

The communication unit 210 may receive an incoming RF signal such as a Bluetooth® or Wi-Fi® signal. The communication unit 210 may down-convert the incoming RF signal to generate an intermediate frequency (IF) or baseband signal, then generate a processed baseband signal by filtering, decoding, and/or digitizing the baseband or IF signal. The communication unit 210 transmits the processed baseband signal to the processor 240 for further processing (such as for web browsing data, online gameplay data, notification data, or other message data).

The communication unit 210 also receives analog or digital voice data or other outgoing baseband data (such as web data, e-mail, or interactive video game data) from the processor 240. The communication unit 210 encodes, multiplexes, and/or digitizes the outgoing baseband data to generate a processed baseband or IF signal. In the case that the communication unit 210 is an RF transceiver, the communication unit 210 up-converts the baseband or IF signal to an RF signal that is transmitted via an antenna.

The processor 240 can include one or more processors or other processing devices and execute the OS 261 stored in the memory 260 in order to control the overall operation of the camera device 102. For example, the processor 240 could control the reception of forward channel signals and the transmission of reverse channel signals by the communication unit 210 in accordance with well-known principles. The processor 240 could also receive analog or digital voice data from the microphone 220, and output analog or digital audio to the speaker 230. In some embodiments, the processor 240 includes at least one microprocessor or microcontroller.

The processor 240 is also capable of executing other processes and programs resident in the memory 260. The processor 240 can move data into or out of the memory 260 as required by an executing process. In some embodiments, the processor 240 is configured to execute the applications 262 based on the OS 261 or in response to signals received from external devices or an operator. The processor 240 is also coupled to the I/O interface 245, which provides the camera device 102 with the ability to connect to other devices such as laptop computers and handheld computers. The I/O interface 245 is the communication path between these accessories and the processor 240.

The processor 240 is also coupled to the input interface 250 and the display 255. The operator of the camera device 102 can use the input interface 250 to enter data into the camera device 102. The display 255 may be a liquid crystal display or other display capable of rendering photographic images.

The memory 260 is coupled to the processor 240. Part of the memory 260 could include a random access memory (RAM), and another part of the memory 260 could include a Flash memory or other read-only memory (ROM).

The camera 265 enables the capture of photographs including successive frames for use in frame blending. For example, the camera 265 could include the hardware, such as one or more lenses, a photodetector element, and other components used to convert light into a digital image. The camera 265 may additionally include specialized processors for performing various functions related to capturing photographs, or the camera 265 may use the processor 240 for these purposes.

The frame blending unit 270 performs frame blending as further described below. The frame blending unit 270 utilizes multiple frames captured by the camera 265 in quick succession in order to generate a single output image with lower noise than any single frame. The frame blending unit 270 estimates the amount of motion (for example, as a percentage of pixels of each frame) that occurs in the frames, and generates a motion statistic that acts as a weighting factor for the amount of blending that will be used. The frame blending unit 270 additionally determines a fusion map that represents which pixels within the frames where motion is detected so that blending can be applied outside of areas with detected motion, using the motion statistic to weight how strongly blending is applied. In some embodiments, the frame blending unit 270 may be a separate piece of hardware that is not incorporated into the processor 240.

Although FIG. 2 illustrates an example of a camera device, various changes may be made to FIG. 2. For example, various components in FIG. 2 could be combined, further subdivided, or omitted and additional components could be added according to particular needs. As a particular example, the processor 240 could be divided into multiple processors, such as one or more central processing units (CPUs) and one or more graphics processing units (GPUs).

Figure 3:
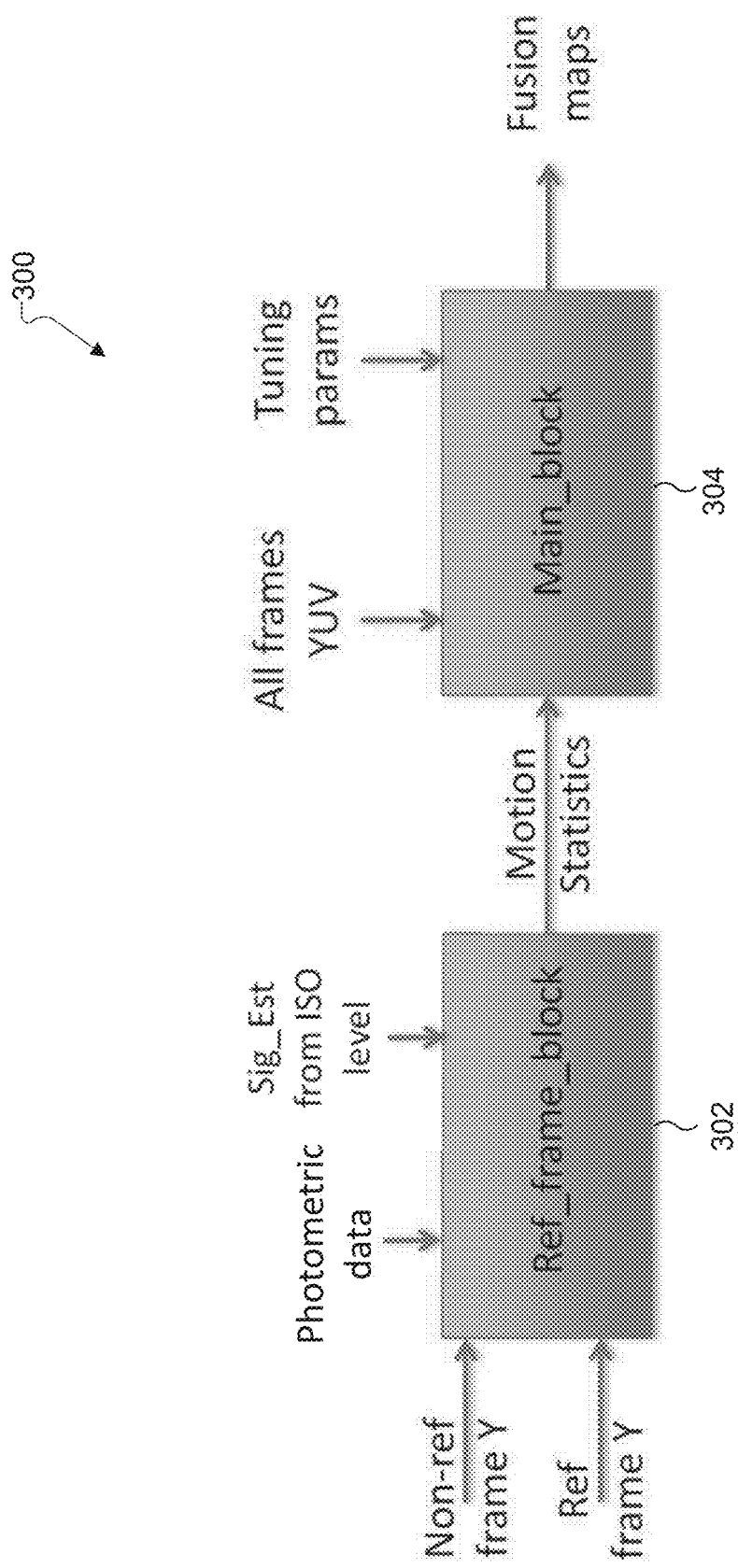
FIG. 3 illustrates a high-level block diagram of an example frame blending algorithm 300 according to various embodiments of this disclosure.

FIG. 3 illustrates a high-level block diagram of an example frame blending algorithm 300 according to various embodiments of this disclosure. The algorithm 300 may be implemented by a frame blending unit 240 within a camera device 102. In this embodiment, YUV420 color encoding is used, although it is understood that other color encoding schemes may be used. Y represents a luminance channel of the frames, and U and V represent chrominance channels of the frames. For simplicity, the U and V channels may be referred to collectively as the UV channels.

Figure 4A:
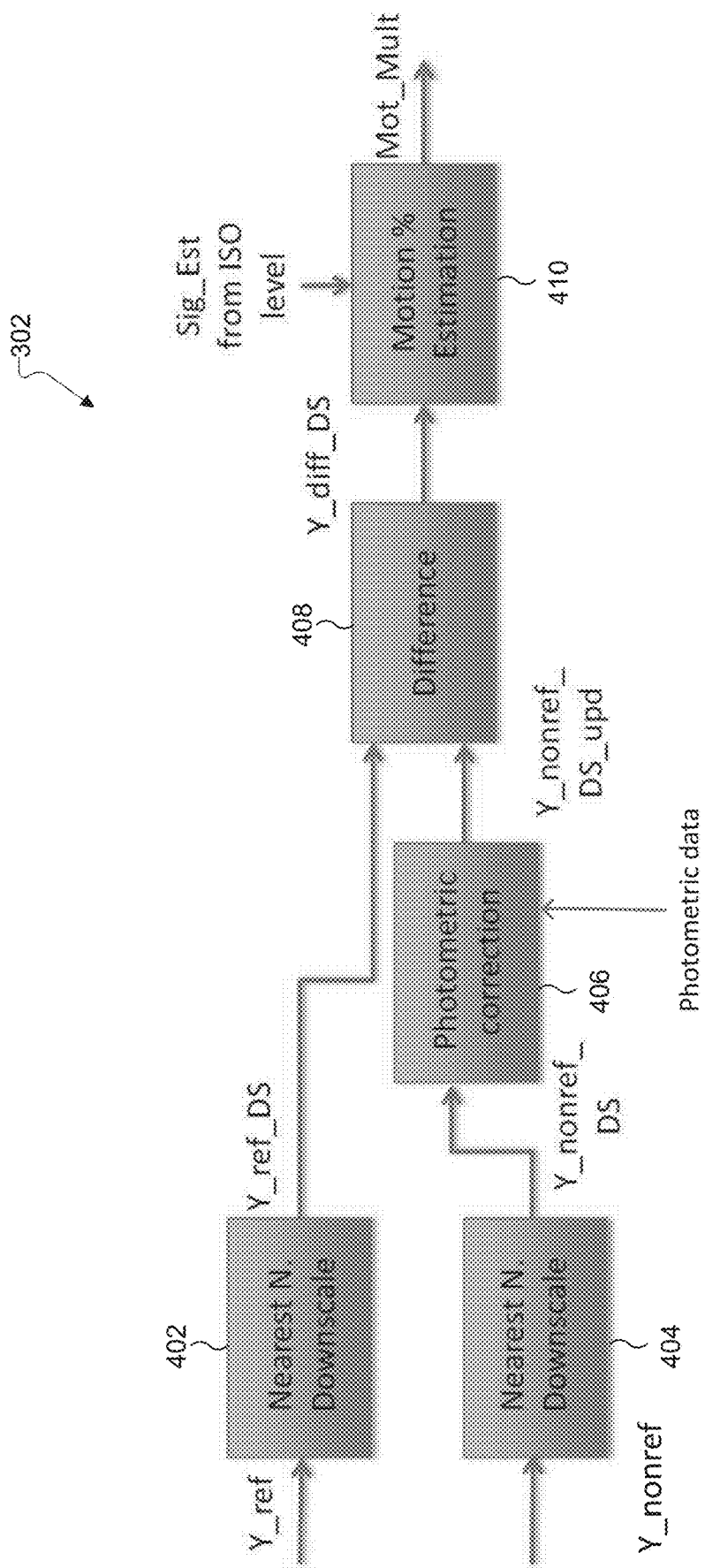
FIG. 4A illustrates an example drilled down block diagram of the reference frame block of FIG. 3.
Figure 4B:
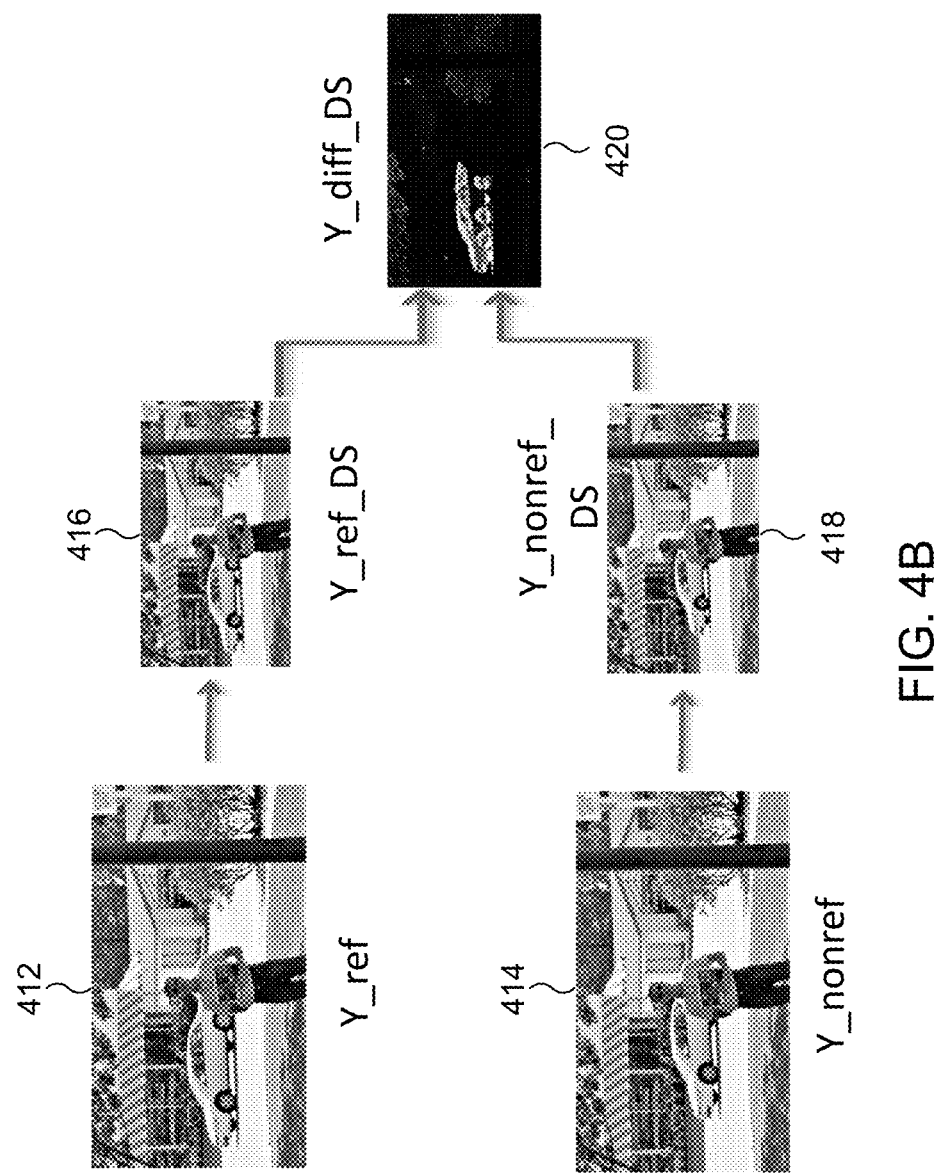
FIG. 4B illustrates example inputs and outputs of some blocks of FIG. 4A.

The reference frame block 302, described further with respect to FIGS. 4A and 4B, estimates an overall level of motion within a set of frames that are compared by the reference frame block 302. In this embodiment, two frames are compared: a selected reference frame (for example, frame 104) and one non-reference frame (for example, frame 106). In other embodiments, additional non-reference frames may be compared to the reference frame using reference frame block 302 for a more accurate estimation of the amount of motion occurring through the frames. In some embodiments, the Y values of the reference and non-reference frame are used to make this comparison, and the UV values are ignored. In other embodiments, the UV values of the reference and non-reference frames may be compared as well. The reference frame block 302 produces a motion statistic (or motion multiplier), which is a weighting factor that represents a measure of how aggressively the frames are blended.

The main block 304, described further with respect to FIGS. 5A and 5B, generates a fusion map that indicates areas of the frames where motion is detected. Accordingly, the frames will not be blended in these areas, because blending frames in areas where motion occurs results in artifacts in the resulting image (for example, an artificial motion blur of a moving object, or "ghosts" of moving objects that were in different positions in different frames). YUV values for each frame, the motion statistic generated by reference frame block 302, and various tuning parameters are used by the main block 304 to generate the fusion map, as described further below. The tuning parameters are used to adjust and fine tune the fusion map.

FIG. 4A illustrates an example drilled down block diagram of the reference frame block 302 of FIG. 3. FIG. 4B illustrates example inputs and outputs of some blocks of FIG. 4A using frame 106 of FIG. 1 as the reference frame and frame 104 of FIG. 1 as the non-reference frame.

The reference frame block 302 receives Y channels of the reference and non-reference frame as inputs. As shown in FIG. 4B, Y_ref 412 corresponds to the Y channel of frame 106 and Y_nonref 414 corresponds to the Y channel of frame 104. The reference frame block 302 estimates the level of motion in the scene based on the difference between the received Y channels and an expected amount of noise given the ISO information for the frame. In this embodiment, the reference frame block 302 receives Y channels for whole frames. In other embodiments, the frames are divided up into "tiles" of a predetermined number of pixels, and each tile is processed independently by reference frame block 302. For example, the frames may be divided into 4×4 tiles, and the reference frame block 302 generates a motion statistic for each tile. Accordingly, in such embodiments the rest of the system applies motion detection and blending at the same tile level.

Downscaling blocks 402 and 404 downscale the reference Y values and the non-reference Y values, respectively, by half, as illustrated by Y_ref_DS 416 and Y_nonref_DS 418, respectively, in FIG. 4B. This is done because YUV420 encoding is used in this embodiment, and in YUV420 encoding the Y channel has twice the resolution of the UV channels. As the system will eventually apply to the UV channels as well as to the Y channel, downscaling the Y channel to match the resolution of the UV channels at the outset is desirable. As noted above, other color encoding schemes may be used, and the downscaling blocks 402 and 404 may be adjusted or omitted accordingly.

Photometric correction block 406 uses photometric data, if available, to correct for photometric difference between the frames so that the photometric difference is not mistaken for motion. Photometric differences between the frames could include, for example, a change of lighting of the scene between frames. Such an event could cause a change in Y values between the frames that is not due to motion or noise.

The difference block 408 then subtracts the downscaled reference Y value from the downscaled non-reference Y value pixel by pixel (or the photometrically corrected downscaled non-reference Y value, if applicable). The resulting pixel map, illustrated by Y_diff_DS 420 in FIG. 4B, highlights the pixels in the scene that have different Y values between the reference frame and the non-reference frame (i.e., pixels for which the absolute value of the difference in Y value between the frames is non-zero), while pixels in the scene that have the same Y values between the frames are zeroed out. However, differences in Y values between the frames are not necessarily attributable to motion, as they could also be caused by noise.

Motion percent estimation block 410 estimates a percentage of pixels within which motion is occurring between the reference and non-reference frames based on the number of pixels for which the difference in Y values between the frames is too big to be explained by noise alone. The motion percent estimation block 410 receives an estimate of the noise sigma value for each frame based on the ISO level used to capture each frame. The motion percent estimation block 410 then determines that a pixel in Y_diff_DS 420 that has a value greater than the estimated noise level actually represents a pixel that includes an object in motion between the frames. In this way, the motion percent estimation block 410 determines what percentage of pixels of the scene contain motion, and uses that information to generate a motion statistic, or motion multiplier (represented by Mot_Mult in FIG. 4A).

The motion statistic is a weighting factor that controls the blending level in the main block 304, as described further below. In general, if there is a lot of motion in the scene, then blending is scaled back to avoid causing ghosting artifacts (that is, adding copies of an object at different positions to the final output image). Conversely, if there is little to no motion in the scene, then the risk of creating ghosting artifacts is low and the system can be more aggressive with blending. Accordingly, the motion statistic decreases as the percentage of pixels determined to contain motion increases, and vice versa. In some embodiments, a lookup table could contain a predetermined mapping between the percentage of pixels that contain motion and the motion statistic. The motion statistic is used by the main block 304, as described further below, as a multiplier to weight the amount of blending that is performed between the frames.

Figure 5:
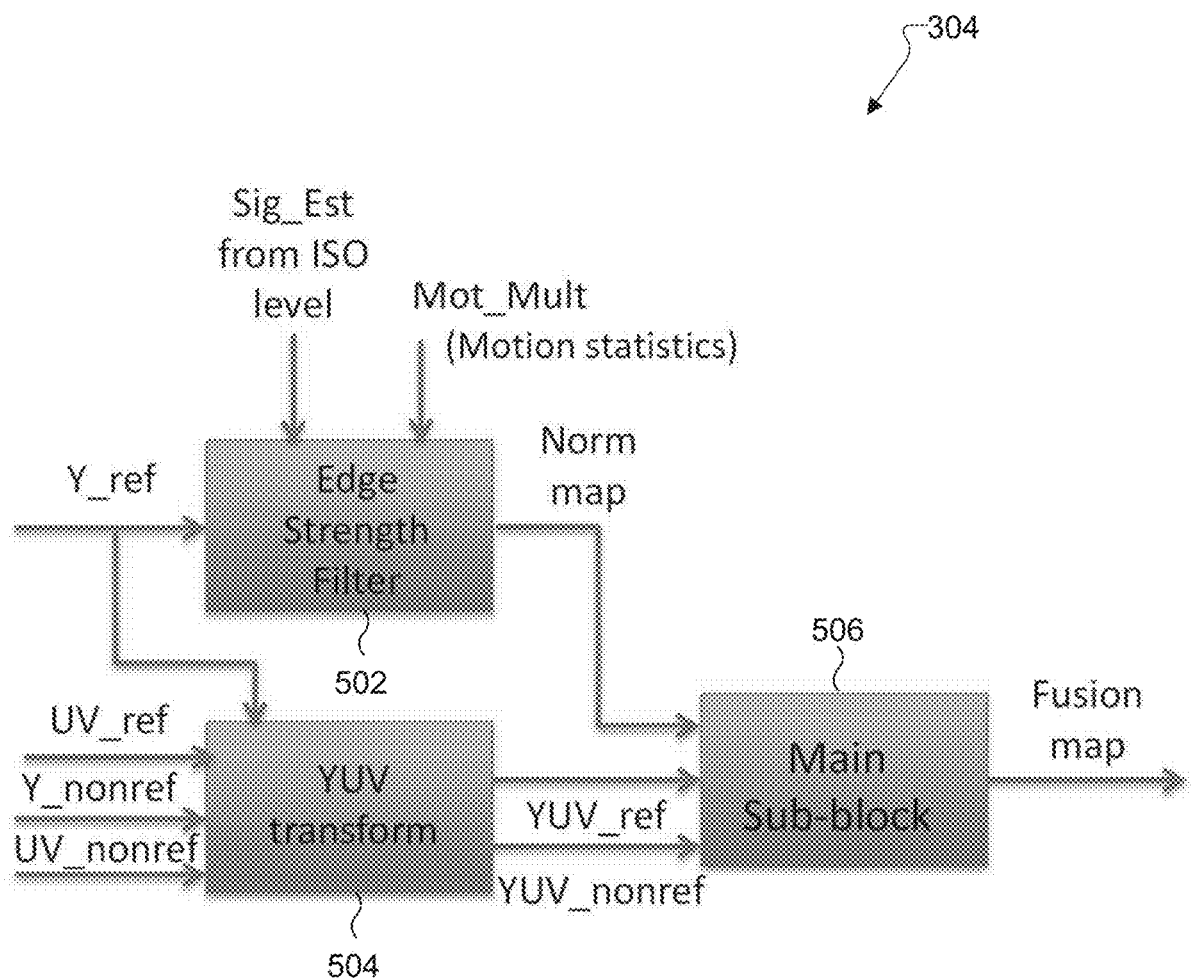
FIG. 5 illustrates an example drilled down block diagram of the main block of FIG. 3.

FIG. 5 illustrates an example drilled down block diagram of the main block 304 of FIG. 3. The main block 304 comprises an edge strength filter block 502, a YUV transform block 504, and a main sub-block 506. The edge strength filter block 502 uses the reference frame to generate a normalization map that will be used as a denominator in the main sub-block 506. The normalization map is based on locations of edges of objects in the frame, and indicates that pixels at edges of objects should be blended. The YUV transform block 504 performs full YUV channel photometric correction with gain and offset to prepare the YUV information of the frames for use by the main sub-block 506. In some embodiments, when information is not provided to indicate that there is a photometric, gain, or offset difference between frames that should be corrected, the YUV transform block 504 applies unit gain and zero offset, leaving the original YUV values unchanged. The main sub-block 506 checks, for each non-reference frame, the differences between the Y, U, and V channels of the non-reference frame and the reference frame, and creates a fusion map that determines the level of blending to apply to the non-reference frame.

Figure 6A:
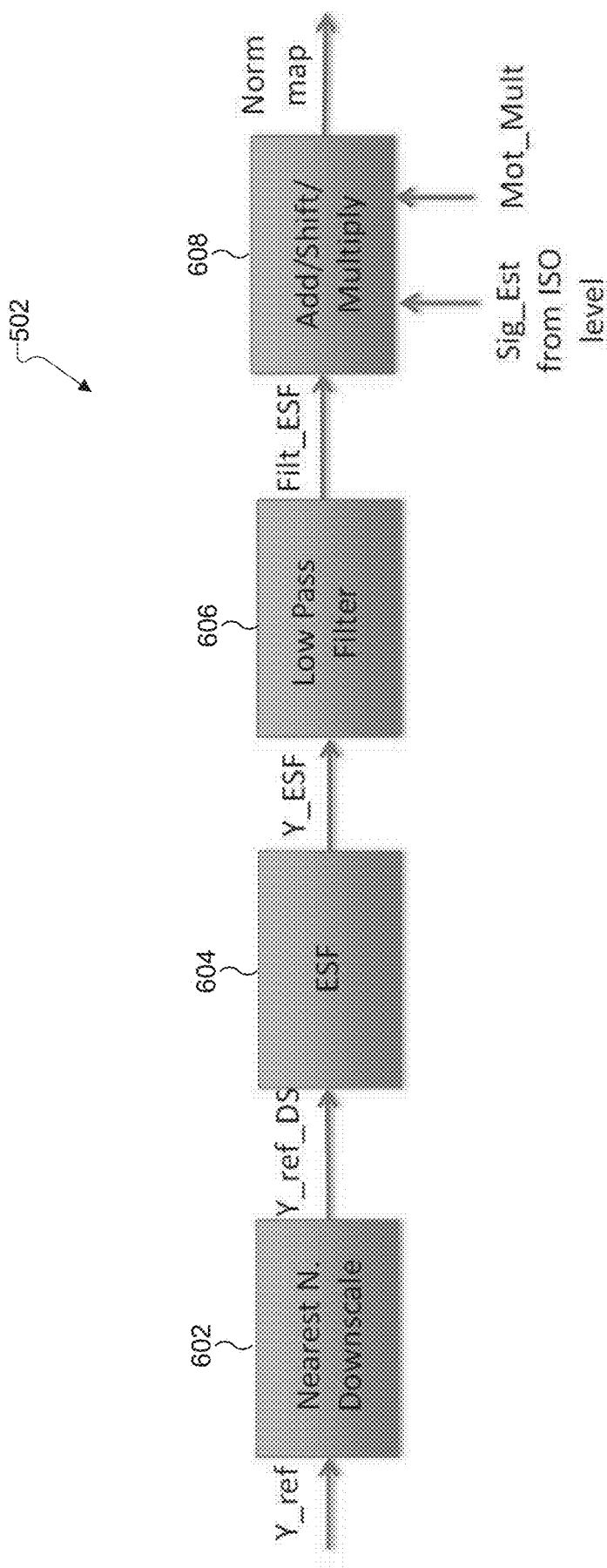
FIG. 6A illustrates an example drilled down block diagram of the edge strength filter block of FIG. 5.
Figure 6B:
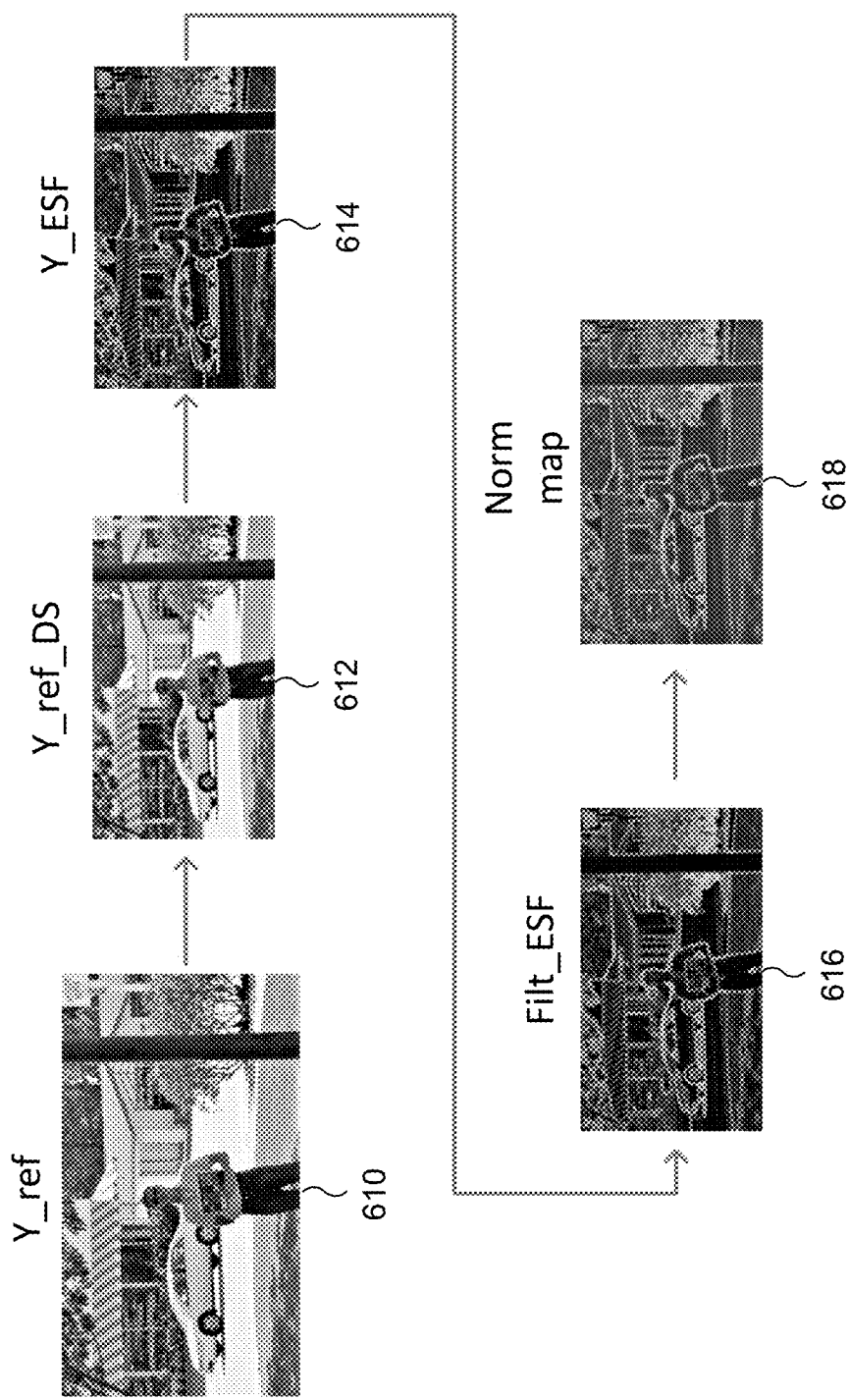
FIG. 6B illustrates example inputs and outputs of some blocks of FIG. 6A.

FIG. 6A illustrates an example drilled down block diagram of the edge strength filter block 502 of FIG. 5. FIG. 6B illustrates example inputs and outputs of some blocks of FIG. 6A using frame 106 of FIG. 1 as the reference frame. The edge strength filter block 502 allows the system to be more forgiving of pixel Y value differences near edges of objects and pixel Y value differences due to changes in texture of objects. There will be some frame mismatch even after frame alignment to correct for camera movement between frames, and this mismatch will manifest itself more near edges and textures in the frame difference signal. This could be mistaken as motion if the system does not normalize for it.

The edge strength filter block 502 comprises a downscaling block 602, an edge strength filter (ESF) 604, a low pass filter (LPF) 606, and an add/shift/multiply block 608. The edge strength filter block 502 receives Y channels of the reference frame (illustrated as Y_ref 610 in FIG. 6B), the estimate of noise sigma value for the reference frame, and the motion statistic (Mot_Mult, generated by the reference frame block 302) as inputs.

Downscaling block 602 downscales the reference Y values by half, as illustrated by Y_ref_DS 612 in FIG. 6B. As noted above with respect to downscaling blocks 402 and 404, this is done because YUV420 encoding is used in this embodiment, and as the system will eventually apply to the UV channels as well as to the Y channel, downscaling the Y channel to match the resolution of the UV channels is desirable.

Edge strength filter 604 detects changes in the Y values of adjacent pixels that indicate an edge or texture in the frame. In this embodiment, the ESF 604 uses a moving window of 3 by 3 pixels to scan the frame, and compares the Y values of sets of two pixels within the 3 by 3 tile to each other. Specifically, the ESF 604 compares the pixels in each set of two pixels that are opposite each other about the center pixel in the tile. This results in a comparison of pixels along the horizontal, vertical, and both diagonal axes of the tile. In this way, the ESF 604 can detect an edge (i.e., a large change in Y value between the compared pixels) that is vertically, horizontally, or diagonally disposed within the 3 by 3 pixel tile. This may be referred to as "orientation free" edge detection. In some embodiments, the comparison of two pixels is performed by summing the absolute values of the differences of the Y values of the pixels. The resulting value is indicative of how strongly an edge is detected. Y_ESF 614 in FIG. 6B is an example illustration of an edge strength map of the reference frame Y channel Y_ref_DS 612 that is generated using the results of the ESF 604.

The low pass filter 606 is applied to the edge strength map that is output by the ESF 604 to soften or smooth the detected edges by removing large values from the map. This results in the final output having better looking edges between objects. Filt_ESF 616 in FIG. 6B illustrates the result of low pass filtering the edge strength map Y_ESF 614 that is output by the ESF 604.

The add/shift/multiply block 608 uses the estimate of the noise sigma value for the reference frame and the motion statistic (Mot_Mult, generated by the reference frame block 302) to alter the filtered edge strength map Filt_ESF 616. As the noise sigma value is the same for all pixels in a frame, the noise sigma value is added to all pixels in the filtered edge strength map. Likewise, the motion statistic is the same for all pixels in a frame (or, in the case that tiles are used, the motion statistic is the same for each tile but may differ between tiles within the frame). All pixels in the filtered edge strength map (after having the noise sigma value added to them) are multiplied by the motion statistic. Additionally, a bit shift operation may be applied to each pixel to normalize the resulting value (i.e., to keep the resulting value below a predetermined limit). In some embodiments, division could be used instead of bit shifting to achieve a similar result. The resulting values are combined into a normalization map (618 in FIG. 6B) that is used by the main sub-block 506, as described below with reference to FIGS. 7A and 7B.

Figure 7A:
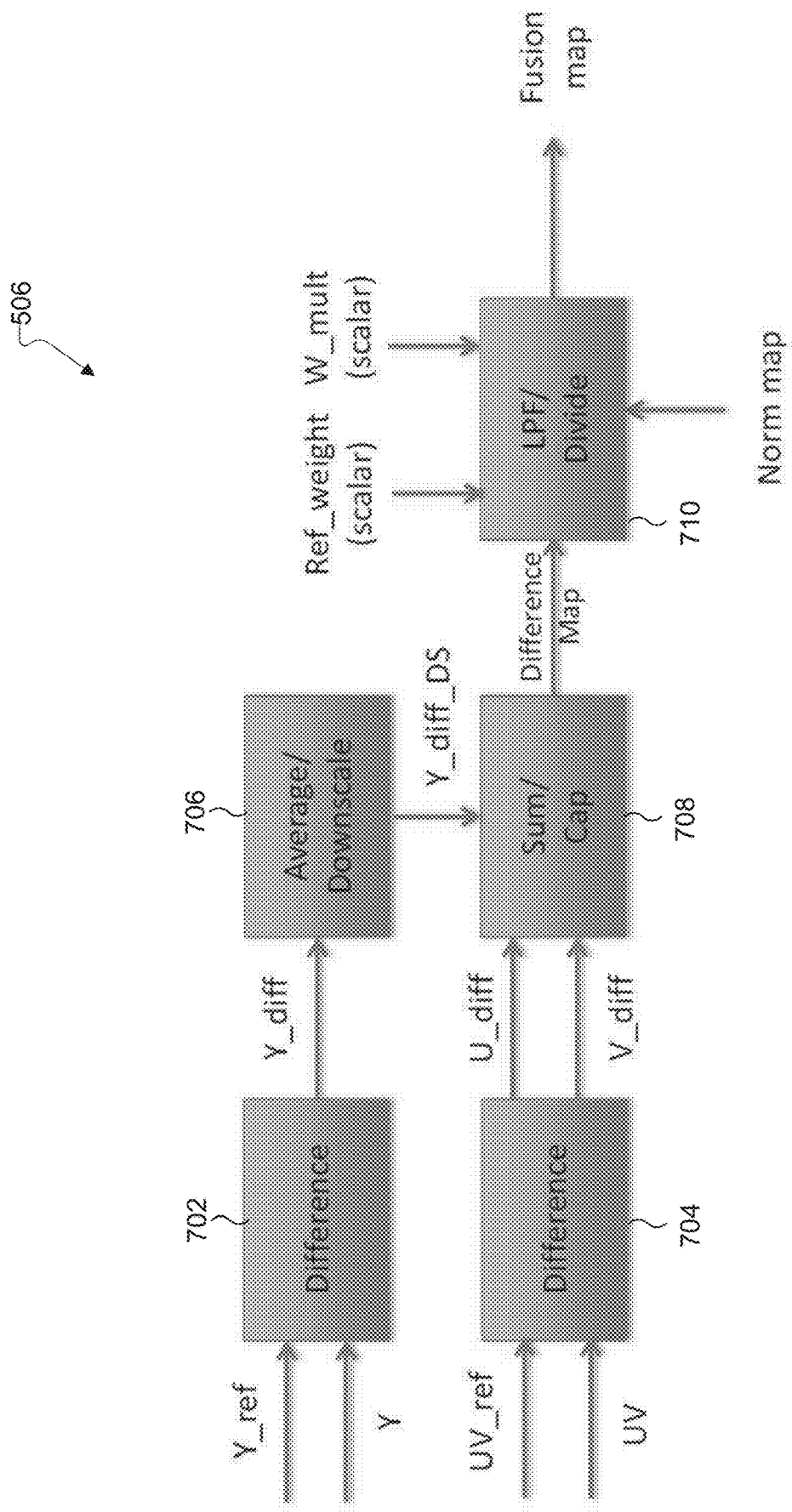
FIG. 7A illustrates an example drilled down block diagram of the main sub-block of FIG. 5.
Figure 7B:
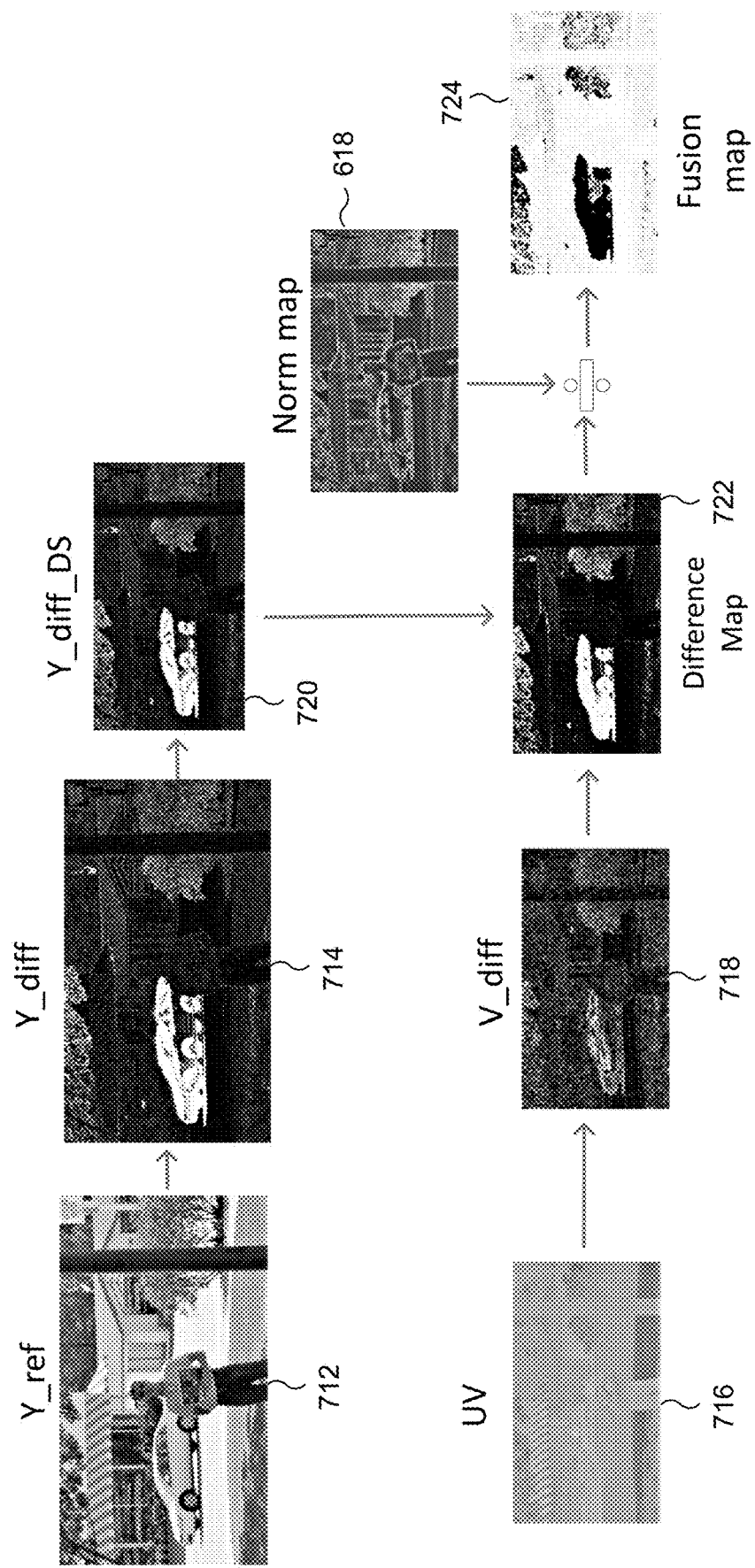
FIG. 7B illustrates example inputs and outputs of some blocks of the main sub-block.

FIG. 7A illustrates an example drilled down block diagram of the main sub-block 506 of FIG. 5. FIG. 7B illustrates example inputs and outputs of some blocks of the main sub-block 506. The main sub-block 506 processes each non-reference frame that will be blended, one at a time.

The difference block 702 determines the difference between the Y channel of the reference frame (712 in FIG. 7B) and the Y channel of the non-reference frame (not pictured in FIG. 7B), resulting in Y_diff (714 in FIG. 7B). The difference block 704 performs the same operation for each of the UV channels, finding the difference between the UV channels of the reference frame (the V channel of the reference frame is illustrated as 716 in FIG. 7B) and the UV channels of the non-reference frame (not pictured in FIG. 7B), resulting in U_diff (not pictured in FIG. 7B) and V_diff (718 in FIG. 7B). As in the other blocks above, the Y channel is downscaled at downscaling block 706 to account for the YUV420 encoding, so that the resolution of the Y channel matches that of the UV channels, resulting in Y_diff_DS (720 in FIG. 7B).

At the summing block 708, Y_diff, U_diff, and V_diff (the difference between the reference and non-reference frame for each channel) are summed together, creating a difference map (722 in FIG. 7B). In some embodiments, the value of each pixel in the difference map may be capped at some value to save on processing power. In some embodiments, the U_diff and V_diff values (the chrominance difference values) may be scaled down by a scaling factor before they are summed with Y_diff so as to reduce the weight that chrominance is given in the final difference map.

At the division and LPF block 710, the normalization map generated by the edge strength filter block 502 is used to determine whether differences between the frames that are represented in the difference map are due to motion, and accordingly to determine which pixels to blend and which to reject from blending. The output of the division and LPF block 710 is a fusion map (724 in FIG. 7B), or motion map, that represents how much blending to apply to each pixel in the non-reference frame. The goal is to apply less blending as more motion is detected in a pixel.

First, the difference map is put through a LPF to smooth out large variances in values of pixels between the frames, which prevents large changes from one pixel to the next in the final output. Next, the difference map is divided by the normalization map on a pixel-by-pixel basis. This may be referred to as normalizing the difference map. Since values in the normalization map are large where an edge is detected (or where a texture change or similar is detected) and small elsewhere, values in the normalized difference map will have significantly reduced values at edges of objects, at changes in textures, etc. As a result, pixels around edges of objects, around changes of textures in objects, etc., will be blended more.

The normalized difference map is then subtracted pixel by pixel from a reference value (illustrated as Ref_weight) that represents an initial blending assumption. That is, the reference value is the initial value of the fusion map. In this embodiment, each pixel has an 8 bit value for its blending weight, and the reference value is set to 255 for each pixel, which represents full blending (that is, in this embodiment the initial assumption is that all pixels will be fully blended). The result of the subtraction is a value for the pixel, from 0 to the reference value, that indicates how much that pixel of the non-reference frame should be blended into the reference frame. This may be called a fusion map value for the pixel.

In some embodiments, a scaling factor (illustrated as W_mult) may be multiplied with the normalized difference map before subtracting from the reference value, which allows fine tuning of the fusion map. Increasing the scaling factor will result in a fusion map that indicates more rejection of blending, while decreasing the scaling factor will result in a fusion map that indicates more blending.

As illustrated in FIG. 7B, light areas of the fusion map 724 indicate blending, while dark areas indicate rejection of blending. For values between 0 and the reference value, partial blending is indicated. The fusion map for each frame is provided to post-processing, which uses the fusion map to determine which pixels to blend from each non-reference frame with the reference frame, and which to reject from blending.

Figure 8:
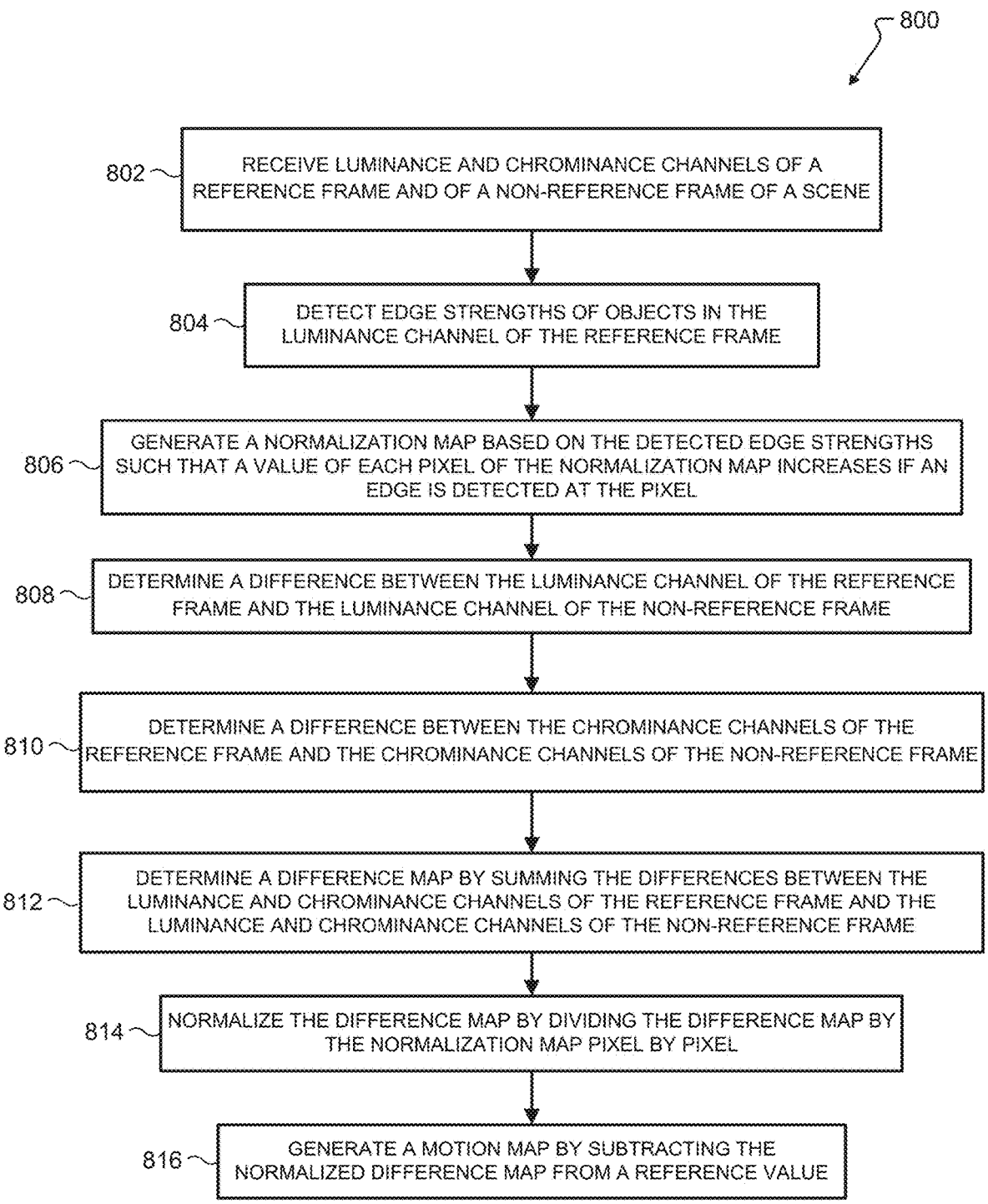
FIG. 8 illustrates a flow diagram of an example method for generating a motion map (or fusion map) for blending frames into a single image. The method could be implemented by a camera device.

FIG. 8 illustrates a flow diagram of an example method 800 for generating a motion map (or fusion map) for blending frames into a single image. The method 800 could be implemented by a camera device 102.

Beginning at block 802, luminance (Y) and chrominance (U and V) channels of a reference frame and of a non-reference frame of a scene are received. For example, these values are extracted from photographs taken in succession by a camera within camera device 102.

At block 804, edge strengths of objects in the luminance channel of the reference frame are detected, generating an edge strength map. As described above, this could include using a moving window of 3 by 3 pixels to scan the frame, and comparing the Y values of sets of two pixels within the 3 by 3 tile to each other. In some embodiments, the comparison of two pixels is performed by summing the absolute values of the Y values of the pixels. The resulting value is indicative of how strongly an edge is detected.

At block 806, a normalization map based on the detected edge strengths is generated such that a value of each pixel of the normalization map increases if an edge is detected at the pixel. This includes adding a noise sigma value to all pixels in the edge strength map, and those pixels are then multiplied by a motion statistic as described above.

At block 808, a difference between the luminance channel of the reference frame and the luminance channel of the non-reference frame are determined, and at block 810, a difference between the chrominance channels of the reference frame and the chrominance channels of the non-reference frame are determined.

At block 812, a difference map is determined by summing the absolute values of differences between the luminance and chrominance channels of the reference frame and the luminance and chrominance channels of the non-reference frame that were determined in blocks 808 and 810.

At block 814, the difference map is normalized by dividing the difference map by the normalization map pixel by pixel, as described above. In some embodiments, the difference map is put through a LPF before being divided by the normalization map.

At block 816, a motion map is generated by subtracting each pixel of the normalized difference map from a reference value. The reference value represents an initial blending assumption, for example that all pixels will be fully blended. The motion map may be used in post processing to blend the one or more non-reference frames with the reference frame to create a final output image that has reduced noise due to the blending, without introducing any motion artifacts that might occur due to motion of the scene between frames. The motion map for each frame is provided to elements in post-processing that use the motion map to determine which pixels to blend from each non-reference frame with the reference frame, and which to reject from blending Although FIG. 8 is described in the context of a camera device 102, it is understood that various modifications may be made to FIG. 8. For example, the method 800 could be performed by any suitable device.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method, comprising:
comparing an input frame to a corresponding reference frame in order to determine if at least one object that is in both frames moves in the input frame and to determine edge strengths of the at least one object;
based on the comparison, determining first regions of the input frame to fully blend with first corresponding regions of the reference frame, second regions of the input frame to reject from blending with second corresponding regions of the reference frame, and third regions of the input frame to partially blend with third corresponding regions of the reference frame; and
partially blending the third regions of the input frame with the third corresponding regions of the reference frame, each third region of the input frame partially blended with its third corresponding region of the reference frame by performing a pixel-by-pixel weighted average of pixel values in the two regions, a weight of the reference frame in the weighted average greater than a weight of the input frame in the weighted average,
wherein each first region of the input frame is fully blended with its first corresponding region of the reference frame using a weighted average with equal weights on the input frame and the reference frame, and
wherein each second region of the input frame is rejected from blending with its second corresponding region of the reference frame using a weighted average with zero weight on the input frame.

2. The method of claim 1, wherein:
the input frame and the reference frame each includes luminance and chrominance channels,
the edge strengths of the at least one object are determined by generating a normalization map based on edge strengths of the at least one object in the reference frame, and
comparing the input frame to the reference frame includes:
determining a difference map based on differences between the luminance and chrominance channels of the reference frame and the luminance and chrominance channels of the input frame; and
normalizing the difference map by dividing the difference map by the normalization map pixel-by-pixel.

3. The method of claim 2, wherein determining the difference map further comprises:
determining a first difference between the luminance channel of the reference frame and the luminance channel of the input frame;
determining a second difference between the chrominance channels of the reference frame and the chrominance channels of the input frame; and
summing the first difference and the second difference.

4. The method of claim 2, wherein generating the normalization map further comprises:
detecting edge strengths of the at least one object in the luminance channel of the reference frame; and
generating the normalization map based on the detected edge strengths such that a value of each pixel of the normalization map increases if an edge is detected at the pixel.

5. The method of claim 4, wherein detecting the edge strengths of the at least one object further comprises:
comparing two pixels of a three-by-three pixel tile of the reference frame with each other by summing absolute values of a difference of luminance values of each of the two pixels, wherein the two pixels that are compared are located opposite each other about a center pixel of the three-by-three pixel tile; and
generating an edge strength map based on the comparisons between the pixels of the reference frame, such that a value of a pixel of the edge strength map is larger if an edge is detected at that pixel.

6. The method of claim 5, further comprising:
receiving an estimated noise sigma value for the reference frame;
receiving a motion multiplier weighting factor;
adding the estimated noise sigma value to each pixel of the edge strength map; and
generating the normalization map by, after adding the estimated noise sigma value to each pixel, multiplying each pixel of the edge strength map by the motion multiplier weighting factor.

7. The method of claim 6, further comprising:
determining a difference between the luminance channel of the reference frame and the luminance channel of the input frame; and
determining a number of pixels of the determined difference for which a value of the pixel is greater than the estimated noise sigma value;
wherein the motion multiplier weighting factor is estimated based on the determined number of pixels for which the value of the pixel is greater than the estimated noise sigma value.

8. The method of claim 2, further comprising:
low pass filtering the difference map before normalizing the difference map; and
multiplying the normalized difference map by a scaling factor before subtracting the normalized difference map from a reference value that represents fully blending the input frame with the reference frame.

9. A camera device, comprising:
a camera configured to capture at least a reference frame and a corresponding input frame of a scene; and
a processor coupled to the camera, the processor configured to:
compare the input frame to the reference frame in order to determine if at least one object that is in both frames moves in the input frame and to determine edge strengths of the at least one object;
based on the comparison, determine first regions of the input frame to fully blend with first corresponding regions of the reference frame, second regions of the input frame to reject from blending with second corresponding regions of the reference frame, and third regions of the input frame to partially blend with third corresponding regions of the reference frame; and
partially blend the third regions of the input frame with the third corresponding regions of the reference frame, each third region of the input frame partially blended with its third corresponding region of the reference frame by performing a pixel-by-pixel weighted average of pixel values in the two regions, a weight of the reference frame in the weighted average greater than a weight of the input frame in the weighted average,
wherein the processor is configured to fully blend each first region of the input frame with its first corresponding region of the reference frame using a weighted average with equal weights on the input frame and the reference frame, and
wherein the processor is configured to reject each second region of the input frame from blending with its second corresponding region of the reference frame using a weighted average with zero weight on the input frame.

10. The camera device of claim 9, wherein:
the input frame and the reference frame each includes luminance and chrominance channels,
to determine the edge strengths of the at least one object, the processor is further configured to generate a normalization map based on edge strengths of the at least one object in the reference frame, and
to compare the input frame to the reference frame, the processor is further configured to:
determine a difference map based on differences between the luminance and chrominance channels of the reference frame and the luminance and chrominance channels of the input frame; and
normalize the difference map by dividing the difference map by the normalization map pixel-by-pixel.

11. The camera device of claim 10, wherein, to determine the difference map, the processor is further configured to:
determine a first difference between the luminance channel of the reference frame and the luminance channel of the input frame;
determine a second difference between the chrominance channels of the reference frame and the chrominance channels of the input frame; and
sum the first difference and the second difference.

12. The camera device of claim 10, wherein, to determine the difference map, the processor is further configured to:
detect edge strengths of the at least one object in the luminance channel of the reference frame; and
generate the normalization map based on the detected edge strengths such that a value of each pixel of the normalization map increases if an edge is detected at the pixel.

13. The camera device of claim 12, wherein, to detect the edge strengths of the at least one object, the processor is further configured to:
compare two pixels of a three-by-three pixel tile of the reference frame with each other by summing absolute values of a difference of luminance values of each of the two pixels, wherein the two pixels that are compared are located opposite each other about a center pixel of the three-by-three pixel tile; and
generate an edge strength map based on the comparisons between the pixels of the reference frame, such that a value of a pixel of the edge strength map is larger if an edge is detected at that pixel.

14. The camera device of claim 13, wherein the processor is further configured to:
receive an estimated noise sigma value for the reference frame;
receive a motion multiplier weighting factor;
add the estimated noise sigma value to each pixel of the edge strength map; and
generate the normalization map by, after adding the estimated noise sigma value to each pixel, multiplying each pixel of the edge strength map by the motion multiplier weighting factor.

15. The camera device of claim 14, wherein the processor is further configured to:
determine a difference between the luminance channel of the reference frame and the luminance channel of the input frame; and
determine a number of pixels of the determined difference for which a value of the pixel is greater than the estimated noise sigma value;
wherein the processor is configured to estimate the motion multiplier weighting factor based on the determined number of pixels for which the value of the pixel is greater than the estimated noise sigma value.

16. The camera device of claim 10, wherein the processor is further configured to:
low pass filter the difference map before normalizing the difference map; and
multiply the normalized difference map by a scaling factor before subtracting the normalized difference map from a reference value that represents fully blending the input frame with the reference frame.

17. A non-transitory computer readable medium embodying a computer program, the computer program comprising computer readable program code that when executed causes at least one processing device to:

compare an input frame to a corresponding reference frame in order to determine if at least one object that is in both frames moves in the input frame and to determine edge strengths of the at least one object;

based on the comparison, determine first regions of the input frame to fully blend with first corresponding regions of the reference frame, second regions of the input frame to reject from blending with second corresponding regions of the reference frame, and third regions of the input frame to partially blend with third corresponding regions of the reference frame;

partially blend the third regions of the input frame with the third corresponding regions of the reference frame, each third region of the input frame partially blended with its third corresponding region of the reference frame by performing a pixel-by-pixel weighted average of pixel values in the two regions, a weight of the reference frame in the weighted average greater than a weight of the input frame in the weighted average;

fully blend the first regions of the input frame with the first corresponding regions of the reference frame, each first region of the input frame fully blended with its first corresponding region of the reference frame using a weighted average with equal weights on the input frame and the reference frame, and reject the second regions of the input frame from blending with the second corresponding regions of the reference frame, each second region of the input frame rejected from blending with its second corresponding region of the reference frame using a weighted average with zero weight on the input frame.

18. The non-transitory computer readable medium of claim 17, wherein:

the input frame and the reference frame each includes luminance and chrominance channels, the computer readable program code that causes the at least one processing device to determine the edge strengths of the at least one object further causes the at least one processing device to generate a normalization map based on edge strengths of the at least one object in the reference frame, and the computer readable program code that causes the at least one processing device to compare the input frame to the reference frame further causes the at least one processing device to:

determine a difference map based on differences between the luminance and chrominance channels of the reference frame and the luminance and chrominance channels of the input frame; and normalize the difference map by dividing the difference map by the normalization map pixel-by-pixel.

19. The non-transitory computer readable medium of claim 18, wherein the computer readable program code that causes the at least one processing device to determine the difference map further causes the at least one processing device to:

determine a first difference between the luminance channel of the reference frame and the luminance channel of the input frame;

determine a second difference between the chrominance channels of the reference frame and the chrominance channels of the input frame; and sum the first difference and the second difference.

20. The non-transitory computer readable medium of claim 18, wherein the computer readable program code that causes the at least one processing device to determine the difference map further causes the at least one processing device to:

detect edge strengths of the at least one object in the luminance channel of the reference frame; and generate the normalization map based on the detected edge strengths such that a value of each pixel of the normalization map increases if an edge is detected at the pixel.

\* \* \* \* \*